US012240359B2

(12) United States Patent
Fuchs et al.

(10) Patent No.: US 12,240,359 B2
(45) Date of Patent: Mar. 4, 2025

(54) LONGITUDINAL SEAT ADJUSTMENT UNIT, SEAT ARRANGEMENT, AND MOTOR VEHICLE

(71) Applicant: IMS GEAR SE & CO. KGAA, Donaueschingen (DE)

(72) Inventors: Gabriel Fuchs, Reichenau (DE); Manuel Hengstler, St. Georgen (DE); Michael Knoepfle, Huefingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 399 days.

(21) Appl. No.: 17/685,801

(22) Filed: Mar. 3, 2022

(65) Prior Publication Data

US 2022/0281357 A1    Sep. 8, 2022

(30) Foreign Application Priority Data

Mar. 4, 2021    (EP) .................................... 21160795

(51) Int. Cl.
  *B60N 2/06*    (2006.01)
  *B60N 2/02*    (2006.01)

(52) U.S. Cl.
  CPC ......... *B60N 2/067* (2013.01); *B60N 2/02246* (2023.08)

(58) Field of Classification Search
  CPC .. B60N 2/067; B60N 2/02246; B60N 2/0735; B60N 2/02253; B60N 2/07; B60N 2/42736; B60N 2/682

(Continued)

(56) References Cited

U.S. PATENT DOCUMENTS 1,806,014 A * 5/1931 Flintermann .......... B60N 2/067
                                                    5/255
5,791,622 A * 8/1998 Gauger .................. B60N 2/067
                                                    297/344.1

(Continued)

FOREIGN PATENT DOCUMENTS

CN    1583460 A    2/2005
CN    102892629 A    1/2013

(Continued)

OTHER PUBLICATIONS

Office action issued Aug. 30, 2023, in parallel Chinese patent application No. 2022 1020 6060.3.
Search Report issued Jul. 28, 2021, for corresponding EP 21160795.7.

*Primary Examiner* — Pinel E Romain
(74) *Attorney, Agent, or Firm* — Nath, Goldberg & Meyer; Jerald L. Meyer

(57) ABSTRACT

The present invention relates to a longitudinal seat adjustment unit (2), comprising a drive device (22), two rails (40) each with at least one spindle (42), which are arranged parallel to a longitudinal axis (X) and so as to be spaced apart from each other, and two drive trains (24) that can be driven by the drive device (22), wherein each of the drive trains (24) has a first transmission unit (31) and a second transmission unit (32), and the second transmission unit (32) is coupled to the drive device (22) via the first transmission unit (31), and wherein the second transmission unit (32) of the respective propulsion train (24) is coupled to one of the rails (40) in order to generate a propulsion in the longitudinal axis (X).

20 Claims, 2 Drawing Sheets

(58) Field of Classification Search
USPC .............................. 296/65.18, 65.13, 15, 18
See application file for complete search history.

(56) References Cited

U.S. PATENT DOCUMENTS

| | | | | |
|---|---|---|---|---|
| 6,105,920 | A * | 8/2000 | Gauger | .................. B60N 2/067 |
| | | | | 297/344.1 |
| 6,575,421 | B1 | 6/2003 | Houston et al. | |
| 7,389,967 | B2 | 6/2008 | Krebs et al. | |
| 11,299,071 | B2 * | 4/2022 | Gropp | .................... B60N 2/067 |
| 11,760,233 | B2 * | 9/2023 | Napau | .................. B60N 2/0825 |
| | | | | 296/65.15 |
| 2005/0194510 | A1 | 9/2005 | Krebs et al. | |
| 2020/0262317 | A1 * | 8/2020 | Napau | .................... B60N 2/067 |
| 2020/0307425 | A1 * | 10/2020 | Höpfner | ............. B60N 2/42736 |

FOREIGN PATENT DOCUMENTS

| | | | |
|---|---|---|---|
| CN | 107921887 A | 4/2018 | |
| CN | 110901478 A | 3/2020 | |
| DE | 3640197 A1 | 10/1987 | |
| DE | 4208948 C2 | 9/1992 | |
| DE | 19642655 C1 | 6/1998 | |
| DE | 19815283 A1 | 10/1999 | |
| DE | 102004013009 A1 | 10/2005 | |
| DE | 102006052936 A1 | 5/2008 | |
| JP | 10138805 A | 5/1998 | |
| JP | 10138806 A | 5/1998 | |
| JP | 10217807 A | 8/1998 | |
| WO | WO-2022053609 A1 * | 3/2022 | ............. B60N 2/067 |

* cited by examiner

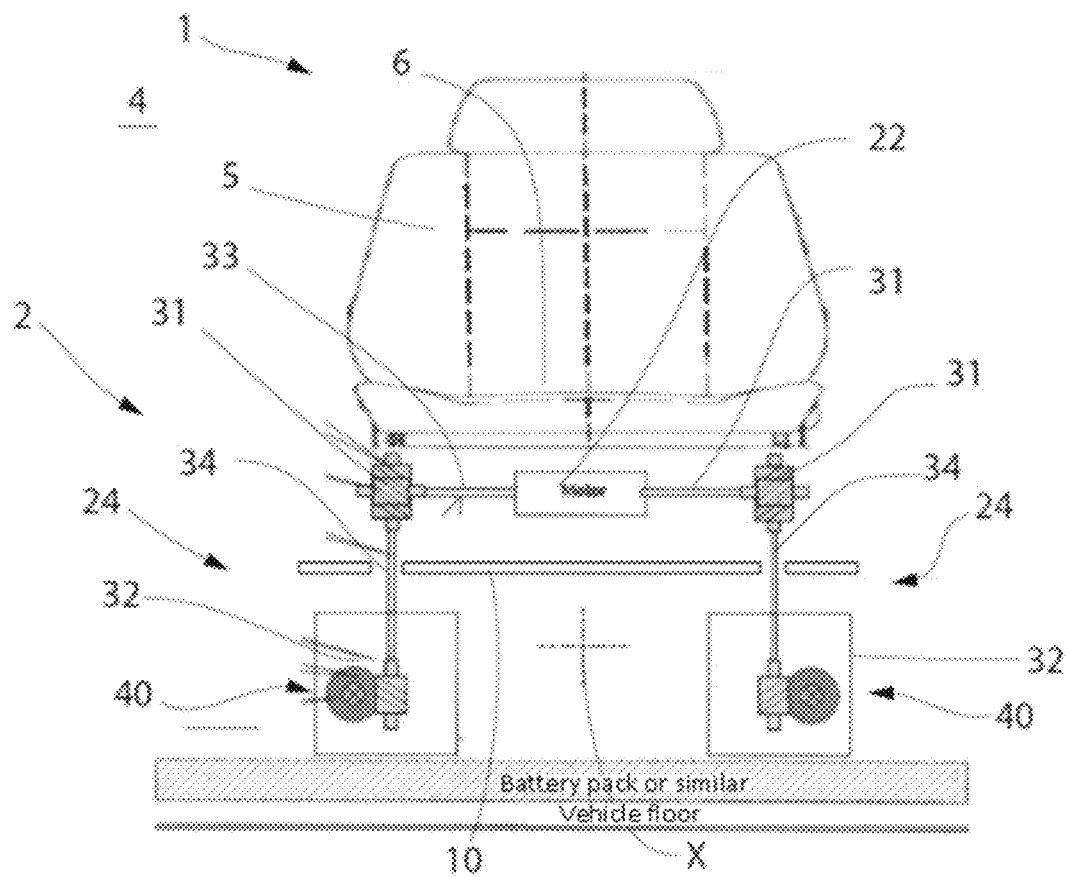
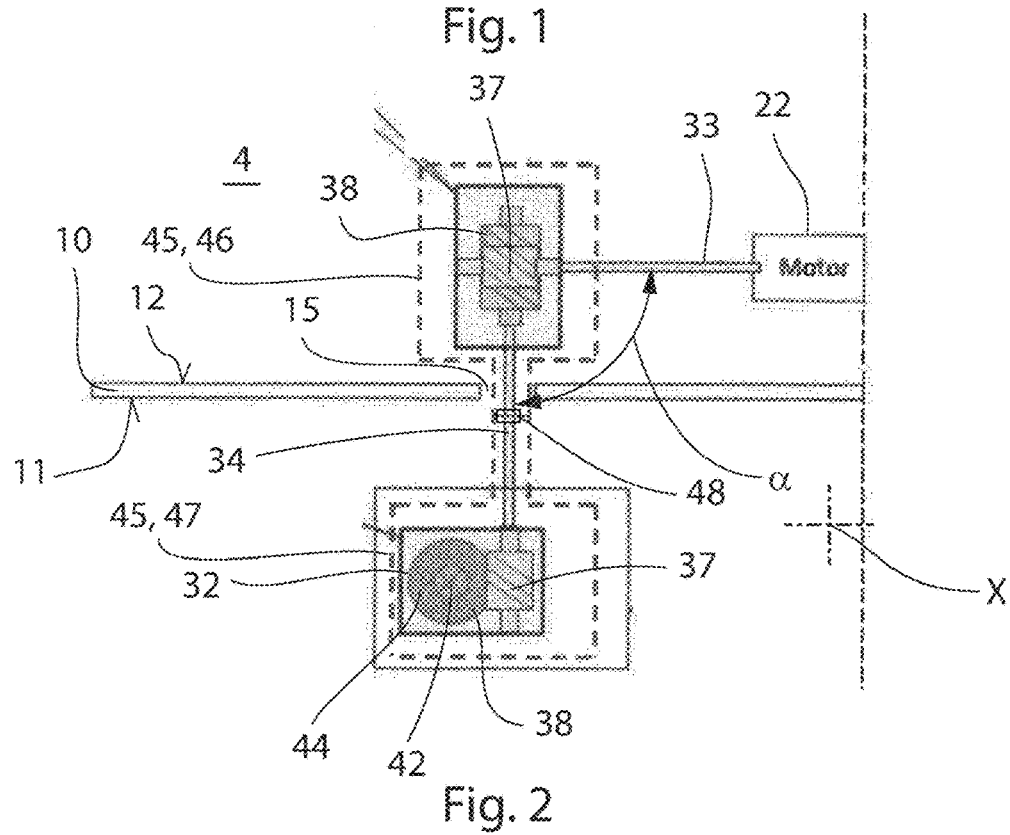
Fig. 1
Fig. 2

LONGITUDINAL SEAT ADJUSTMENT UNIT, SEAT ARRANGEMENT, AND MOTOR VEHICLE

FIELD

The present invention relates to a longitudinal seat adjustment unit for a motor vehicle, a seat arrangement with such a longitudinal seat adjustment unit with two rails, each with at least one spindle arranged parallel to a longitudinal axis and so as to be spaced from each other, and a motor vehicle with such a longitudinal seat adjustment unit.

BACKGROUND

Longitudinal seat adjustment units are known from prior art in different configurations and serve to adjust the position of a seat in a longitudinal axis of a vehicle. Longitudinal seat adjustment units typically interact with a lower rail fixed on a vehicle floor of a chassis and an upper rail arranged within it, the upper rail being motorized by means of the longitudinal seat adjustment unit. The adjustment of the upper rail by means of the longitudinal seat adjustment unit takes place by means of a spindle which is arranged on a lower rail, hereinafter referred to as the rail, and is supported at its respective first end and second end. The rail is attached to the chassis.

In prior art, the lower rail is connected to the vehicle interior or passenger compartment or the side of the floor of the vehicle facing the passenger compartment of the vehicle, wherein the lower rail is held at a distance from the vehicle floor by means of a supporting structure so that the seat is held at a distance from the vehicle floor so that a safe and ergonomic seating position can be taken.

Examples of longitudinal seat adjustment units have been described, for example, in DE 36 40 197 A1, DE 42 08 948 C2, DE 196 42 655 C2, DE 198 15 283 A1, DE 10 2004 013 009 A1, and DE 10 2006 052 936 A1.

Such longitudinal adjustment units have proven themselves in prior art, but these have the disadvantage that components protrude from the vehicle floor into the passenger compartment. However, novel interior concepts of motor vehicles require a flat vehicle floor and larger travel distances for the versatile use of the vehicle interior, so that a variable seating arrangement is possible in the vehicle that is adapted to individual needs.

This is where the present invention begins.

SUMMARY

The object of the present invention is to propose an improved longitudinal seat adjustment unit, which expediently eliminates the disadvantages known from prior art. The longitudinal seat adjustment unit is intended to make it possible to adjust a seat in an electrified manner in a longitudinal direction of a vehicle, wherein long travel distances and a level vehicle floor, which does not represent danger sources and/or obstacles, are to be realized. In addition, the longitudinal seat adjustment unit should preferably have a high crash resistance and should preferably be suitable for integral belt seats.

These objectives are achieved by the longitudinal seat adjustment unit with the features of claim 1, a seat arrangement with the features of claim 17, and the motor vehicle with the features of claim 20 a drive device, two rails, each with at least one spindle, arranged parallel to a longitudinal axis and so as to be spaced from each other, and two drive trains that can be driven by the drive device. Each of the drive trains has first and second transmission units, and the second transmission unit is coupled to the drive device via the first transmission unit. The second transmission unit is coupled to one of the rails in order to generate a propulsion in the longitudinal axis. First and second subsections can be detachably coupled by means of a connection.

The longitudinal seat adjustment unit has a drive device, two rails each with at least one spindle, which are arranged parallel to a longitudinal axis and so as to be spaced apart from each other, and two drive trains that can be driven by the drive device. Furthermore, it is provided that each of the drive trains has a first transmission unit and a second transmission unit, and the second transmission unit is driven by means of the first transmission unit with the drive device. Furthermore, according to the invention, the second transmission unit of the respective drive train is coupled to or is engaged with a spindle of the respective rail in order to generate a propulsion in the longitudinal axis.

The present invention is based on the idea of using two drive trains driven by a common electric drive device in order to cooperate with the spindle via two transmission units connected to one another at a distance and in series in order to generate a propulsion in the longitudinal axis.

The longitudinal seat adjustment unit should preferably be able to be used for two different drive concepts, namely with a fixed spindle and, in addition, with a rotating spindle. In the case of a fixed spindle, a spindle nut is rotated by the second transmission unit on the spindle to generate a propulsion and follows the forced guidance through the spindle. In the case of a rotating spindle, the second gear unit rotationally drives the spindle and a rotationally fixed spindle nut converts the rotation of the spindle into a lateral movement along the longitudinal axis.

The drive train according to the present invention is understood to mean the components of the longitudinal seat adjustment unit which apply or transfer the power of the drive device to the spindle in order to generate a propulsion in the longitudinal axis.

The first transmission unit and the second transmission unit of at least one of the two drive trains are arranged at a distance from one another in such a way that the first transmission unit and the second transmission unit can be arranged on opposite sides in the direction of the longitudinal axis of at least one seat and the respective drive train engages the vehicle floor.

In an advantageous development of the present invention, the first transmission unit and/or the second transmission unit of at least one of the two drive trains comprises or comprise a worm gear. Worm gears have a high ratio. Therefore, in the case of the required power of the drive device, the power, in particular by means of a high rotational speed, can be guided to the second transmission unit. The dimensioning of the drive train enables a compact design and a space-saving arrangement in the limited available installation space.

Furthermore, it is advantageous if the respective worm gear has a self-locking system, as a result of which an undesired displacement of the seat can be inhibited, for example by vibrations.

In accordance with a preferred further development, it has proven to be advantageous if the first transmission unit and the second transmission unit of at least one of the two drive trains have the same gear ratio and the same toothing. By means of the substantially identical design of the first transmission unit and the second transmission unit, as many identical parts as possible can be used, as a result of which the production costs can be reduced.

According to a further development, the first transmission unit can be connected to the drive device via a first shaft and/or the second transmission unit to the first transmission unit via a second shaft. By means of the shafts, it is possible to arrange the first transmission unit and the second transmission unit and/or arrange the first transmission unit and the drive device so as to be distanced from one another, wherein the respective distance can be configured as desired in order to adapt the longitudinal seat adjustment unit to the conditions.

Furthermore, it has proved to be advantageous if the first shaft is arranged at an angle and offset to the second shaft, and/or if the first shaft and the second shaft are arranged transversely to the longitudinal axis. The angle between the first shaft and the second shaft makes it possible to penetrate the opening in the interior floor preferably perpendicularly to a plane of the interior floor, during which the first shafts of the drive trains converge in a direction toward one another, preferably parallel to the interior floor in the common drive device.

According to a preferred configuration, the angle between the first wave and the second wave is 90°±15°, more preferably 90±10°, even more preferably 90°±5°, and most preferably approximately 90°.

According to a further advantageous configuration of the present invention, the first shaft of the two drive trains is a single piece. The first transmission units of the two drive trains are thus connected to one another by a common first shaft. This has the advantage that the two drive trains are synchronized.

Furthermore, it has proven to be advantageous if the drive device is arranged between the two drive trains. A common drive device is preferably arranged centrally between the two drive trains, as a result of which a symmetrical power distribution can take place.

In an advantageous manner, the first shaft and/or the second shaft is or are a flex shaft. Flex shafts are characterized in that they can bridge a distance in a simple and variable manner, wherein tolerances between the drive trains and the common drive device as well as tolerances within the respective drive train, in particular between the first transmission unit and the second transmission unit can be compensated for. In addition, flex shafts dampen the transference of vibrations.

In a further development of the present invention, the second transmission unit of at least one drive train is coupled to the spindle via a spindle nut. The spindle nut engages in the at least one spindle of the rail, wherein, preferably depending on the drive concept, the spindle nut is either arranged on the spindle in a rotationally movable manner or can be connected to the spindle in a rotationally fixed manner. The spindle nut can preferably be formed on the worm of the worm gear of the second transmission unit.

In a further development of the present invention, the first transmission unit and the second transmission unit of at least one drive train are arranged in a supporting part. The supporting part can be, for example, a bracket which carries the at least one seat of the vehicle and is held on the rail so as to be mounted. The supporting part preferably has a carriage which is guided via the rail, wherein the carriage is even more preferably movable in the longitudinal axis and, moreover, is held on the rail by positive locking.

Furthermore, according to a preferred configuration, the supporting part can have at least a first subsection and a second subsection, wherein the first transmission unit is arranged in the first subsection and the second transmission unit is arranged in the second subsection. The first subsection and the second subsection can also be detachably coupled by means of a connection, as a result of which it is possible, for example, to detach the seat from the rail and remove it from the vehicle by releasing the connection.

According to a further development, it can be advantageous if the second shaft of at least one of the two drive trains has a first shaft section and a second shaft section and if the connection can detachably connect the first shaft section and the second shaft section. Thus, when the connection are detached, not only the two subsections of the supporting part are separated, but also the respective drive train, as a result of which a particularly simple disassembly for realizing individual seat concepts in the interior of the vehicle is possible.

In a further development of the present invention, the respective rail comprises two spindles. The two spindles of the respective rail are arranged so as to be parallel with and spaced apart from one another and are each coupled to one of the second transmission units of the respective drive train for generating a propulsion in the longitudinal axis. The two spindles are preferably arranged mirror-symmetrically with respect to the second transmission unit, wherein, even more preferably, the two spindles lie in a plane which is preferably arranged perpendicularly to the second shaft and/or preferably parallel to the first shaft and/or parallel to the interior floor.

In the case of a seat with one or more seat surfaces and integrated straps, there is a special requirement for the crash resistance. The forces that occur must be predominantly absorbed by the spindle, and therefore the spindle diameter must be adjusted accordingly. The two spindles enable the height of the longitudinal seat adjustment unit to be minimized by using smaller spindle diameters, wherein the height is a valuable asset with regard to the electrification of the vehicles. A power storage device can be provided adjacent to the interior floor on the side facing away from the passenger compartment.

The two spindles preferably operate in opposite directions, which results in a particularly simple and compact construction of the second transmission unit.

A further aspect of the present invention relates to a seat arrangement, in particular a seat arrangement for a motor vehicle, comprising an interior floor with a passenger compartment side and an underside, and a previously described longitudinal seat adjustment unit, the interior floor having at least two parallel and spaced openings in a longitudinal axis which connect the passenger compartment side and the underside, wherein the rails and the second transmission units are arranged on the underside, and the first transmission units and the drive device are arranged on the passenger compartment side. The propulsion of the seat arrangement is consequently generated on the underside of the interior floor facing away from the passenger compartment, as a result of which the rail is arranged so as to be concealed from the passenger compartment, and a level passenger compartment floor can be realized, which allows any arrangement of the seats in the motor vehicle, without components protruding from the interior floor into the passenger compartment.

Furthermore, it has proven to be advantageous if the seat arrangement has a seat with at least one seat surface, which is held at a distance from the rail by the supporting part. The seat is preferably an integral belt seat, which is distinguished by the fact that, for each seat surface, a belt is preferably attached to or integrated in the seat and all the forces of the belt are led into the supporting part via the seat. The seat can be a row of seats with two or preferably three seat surfaces.

The supporting part preferably protrudes through the opening and can also—as already described above—have at least one first subsection and a second subsection, the first subsection preferably protruding from the passenger compartment side into the respective opening. As a result, after the dismantling of the at least one seat, the second subsection remains in the opening in a receding manner, as a result of which no component of the longitudinal seat adjustment unit protrudes into the passenger compartment.

BRIEF DESCRIPTION OF THE DRAWINGS

An exemplary embodiment and a further development of a longitudinal seat adjustment unit according to the invention are described in detail below with reference to the accompanying drawing. In the drawings:

FIG. 1 shows a schematic front view of the height structure on a seat arrangement with a longitudinal seat adjustment unit with a drive device and two drive trains for adjusting a seat along a longitudinal axis, FIG. 2 shows an enlarged representation of a drive train according to FIG. 1.

DETAILED DESCRIPTION

Figure 3:
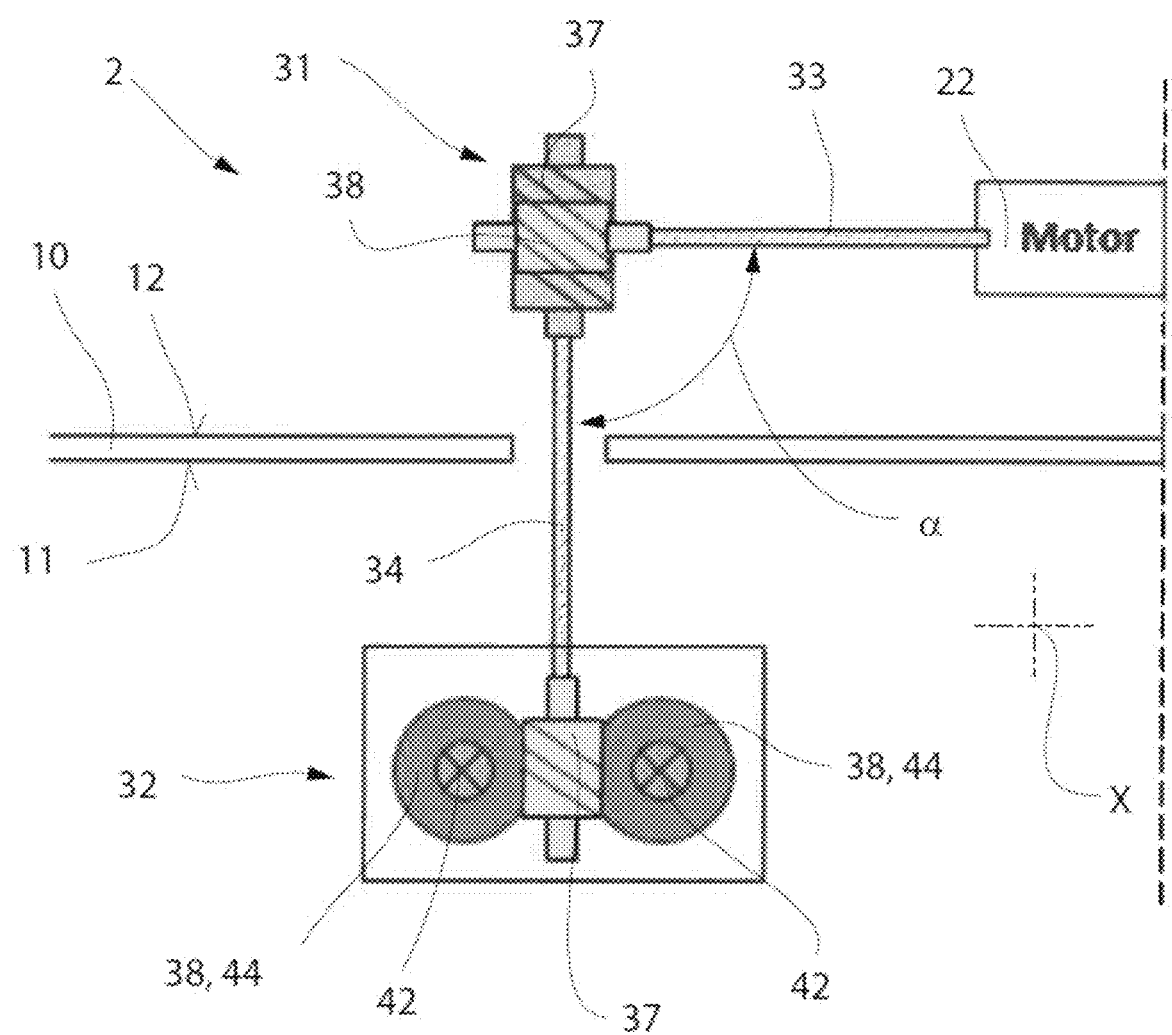
FIG. 3 shows a further development of the longitudinal seat adjustment unit according to FIG. 1, wherein the rail has two parallel and spaced spindles.

Below, identical or functionally identical components of the two exemplary embodiments are marked with the same reference signs. For the sake of clarity, not all the same or functionally identical parts are provided with a reference number in the individual figures.

FIG. 1 shows a front view of the height structure on a seat arrangement 1 with a seat 5 with a seat surface 6 of an interior space 4 of a motor vehicle with a longitudinal seat adjustment unit 2, which is only shown in part.

The seat arrangement 1 comprises an interior floor 10 and the longitudinal seat adjustment unit 2.

As shown in FIG. 2, the interior floor 10 has a passenger compartment side 12 and an underside 11, wherein the passenger compartment side 12 faces the passenger compartment 4 and the seat 5, and the underside 11 is arranged on the side facing away from the passenger compartment 4 and the seat 5.

The interior floor 10 has an opening 15 for each drive train 24, wherein an opening 15 of a drive train 24 is shown in FIG. 2. The two openings 15 are arranged so as to be parallel with and spaced apart from one another in a longitudinal axis X. The longitudinal axis X is preferably predetermined by means of the vehicle longitudinal axis.

The seat arrangement 1 can have a seat 5 with a seat surface 6, it being noted that the seat 5 of the seat arrangement 1 can also comprise a plurality of seat surfaces 6, which form a row of seats.

Furthermore, it can be seen from FIG. 1 that the longitudinal seat adjustment unit 2 comprises an electric drive device 22, two drive trains 24 and two rails 40, wherein the respective drive train 24 each has a first transmission unit 31 and a second transmission unit 32. The second transmission unit 32 of each drive train 24 is connected to the common drive device 22 via the first transmission unit 31 of each drive train 24, as a result of which drive power of the drive device 22 is evenly distributed to the drive trains 24 and is transmitted to the second transmission unit 32 via the first transmission unit 31.

The first transmission unit 31 is connected to the drive device 22 by means of a first shaft 33 and the second transmission unit 32 is connected to the first transmission unit 31 via a second shaft 34.

The first shaft 33 and/or the second shaft 34 enable the spaced arrangement of the drive device 22 to the first transmission unit 31 or the first transmission unit 31 to the second transmission unit 32, wherein the first shaft 33 and/or the second shaft 34 is/are more preferably formed from a flex shaft, as a result of which the respective shaft can compensate for tolerances by elastic deformations and the transmission of vibrations can also be reduced.

The first transmission units 31 of the two drive trains 24 as well as the drive device 22 are arranged on a side of the seat 5 facing the interior floor 10 on the passenger compartment side 12 of the interior floor, wherein the first transmission units 31 can be arranged transversely to the longitudinal axis X, preferably in opposite end regions of the seat 5.

The second transmission units 32 are arranged or located on the underside 11 of the interior floor 10 or arranged at least in the opening 15 in such a way that the second transmission units 32 do not protrude from the opening 15 in the direction of the passenger compartment. Accordingly, the second shaft 34 of the respective drive train 24 protrudes into the opening 24 in order to connect the first transmission unit 31 to the second transmission unit 32.

The respective first transmission unit 31 and the respective second transmission unit 32 can each comprise a worm gear with a worm 37 and a worm wheel 38, wherein the first transmission unit 31 and the second transmission unit 32 are preferably substantially identical in design.

The first shaft 33 and the second shaft 34 are arranged at an angle $\alpha$ and offset to one another, wherein the angle $\alpha$ in the illustrated embodiment is approximately 90° and thus the second shaft 34 runs perpendicularly to a plane of the interior floor 10.

The first shafts 33 of the two drive trains 24 can form a common first shaft 33, as a result of which the two drive trains 24 are driven by a common shaft 33 from the drive device 22.

The rail 40 is arranged on the underside 11 of the interior floor 10 and is accessible from the passenger compartment through the opening 15. In the illustrated embodiment, the rail 40 comprises a spindle 42 which, according to FIG. 1, can be arranged in the plane of the interior floor so as to be offset to the opening 15. The spindle 42 is arranged parallel to the longitudinal axis X.

Furthermore, it can be seen from FIG. 2 that the seat arrangement 2 comprises a supporting part 45. The supporting part 45 can support the seat 5 on the rail 40 and accommodate the longitudinal seat adjustment unit 2, in particular the drive trains 24, as well as the drive device 22. The supporting part 45 can comprise a carriage (not shown) which is guided on the rail 40 in the longitudinal axis X, preferably in a positively locking manner.

The supporting part 45 can be designed in the manner of a U-shaped support bracket and can also have a first subsection 46 and a second subsection 47. The first subsection 46 preferably accommodates the drive device 22 and the respective first transmission unit 31 of the two drive trains 24, during which the second subsection 47 receives the second transmission unit 32.

The second subsection 47 is designed in such a way that it does not protrude above the interior floor 10 on the passenger compartment side 12, but rather that the second subsection 47 is either completely arranged on the underside 11 or protrudes into the opening 15 without protruding through it. The second subsection 47 is preferably arranged in a receding manner in the opening.

The second transmission unit 32 is arranged on the underside 11 of the interior floor 10 and can be connected to the first subsection 46 in a detachable manner by connection means 48 indicated in FIG. 2.

The second shaft 34 can have a first shaft section and a second shaft section, wherein the first shaft section and the second shaft section can be detachably connected by means of the connection 48.

The longitudinal seat adjustment unit 2 can be divided in order to remove the seat 5 from the passenger compartment 4 of the vehicle, the connection 48 separating the connection between the subsections 46, 47 of the supporting part 45 and between the two shaft sections of the second shaft 34.

The rail 40 is arranged on the underside 11 of the interior floor 10 and is accessible from the passenger compartment through the opening 15. In the illustrated embodiment, the rail 40 comprises a spindle 42 which, according to FIG. 1, can be arranged in the plane of the interior floor so as to be offset to the opening 15.

The spindle 42 is driven to the second transmission unit 32 in a known manner in such a way that, when the drive device 22 is actuated, the rotational movement transmitted by the respective drive train 24 is converted into a lateral movement in the longitudinal axis X.

FIG. 3 shows a further development of the above-described embodiment according to FIGS. 1 and 2, wherein the two embodiments differ in the design of the rail 40. As can be seen from FIG. 3, the respective rail 40 has two spindles 42, wherein the spindles 42 are arranged on both sides of the respective second transmission unit 32 in relation to the longitudinal axis X. By means of such a design of the rail 40, higher crash resistances can be realized without the structural height being changed in the limited construction space below the interior floor 10. The two spindles 42 of the respective rail are designed to operate in opposite directions and each have a spindle nut 44, wherein the two spindle nuts 44 are in direct contact with a component of the second transmission part 32.

LIST OF REFERENCE NUMERALS

1 Seating arrangement
2 Longitudinal seat adjustment unit
4 Passenger compartment
5 Seat
6 Seat surface
10 Interior floor
11 Underside
12 Passenger compartment side
15 Opening
22 Drive device
24 Drive train
31 First transmission unit
32 Second transmission unit
33 First shaft
34 Second shaft
37 Worm
38 Worm wheel
40 Rail
42 Spindle
44 Spindle nut
45 Supporting part
46 First subsection
47 Second subsection
48 Connection
X Longitudinal axis
α Angle

The invention claimed is:

1. A longitudinal seat adjustment unit (2), comprising
a drive device (22),
two rails (40), each with at least one spindle (42), which are arranged parallel to a longitudinal axis (X) and so as to be spaced from each other, and
two drive trains (24) that can be driven by the drive device (22),
wherein each of the drive trains (24) has a first transmission unit (31) and a second transmission unit (32), and the second transmission unit (32) is coupled to the drive device (22) via the first transmission unit (31), and
wherein the second transmission unit (32) of the respective propulsion train (24) is coupled to one of the rails (40) in order to generate a propulsion in the longitudinal axis (X),
further comprising a first subsection (46) and a second subsection (47) can be detachably coupled by a connection (48).

2. The longitudinal seat adjustment unit (2) according to claim 1, wherein the first transmission unit (31) and/or the second transmission unit (32) comprise or comprises a worm gear.

3. The longitudinal seat adjustment unit (2) according to claim 1, wherein the first transmission unit (31) and the second transmission unit (32) have a same gear ratio and a same toothing.

4. The longitudinal seat adjustment unit (2) according to claim 1, wherein the first transmission unit (31) is connected to the drive device (22) via a first shaft (33) and the second transmission unit (32) is connected to the first transmission unit (31) via a second shaft (34).

5. The longitudinal seat adjustment unit (2) according to claim 4, wherein the first shaft (33) is arranged at an angle (a) and offset to the second shaft (34) and in that the first shaft (33) and the second shaft (34) are arranged transversely to the longitudinal axis (X).

6. The longitudinal seat adjustment unit (2) according to claim 5, wherein the angle (a) is 90°=15°.

7. The longitudinal seat adjustment unit (2) according claim 4, wherein the first shaft (33) of the two drive trains (24) is a single piece.

8. The longitudinal seat adjustment unit (2) according to claim 4, wherein the drive device (22) is arranged between the two drive trains (24).

9. The longitudinal seat adjustment unit (2) according claim 4, wherein the first shaft (33) and/or the second shaft (34) is or are a flex shaft.

10. The longitudinal seat adjustment unit (2) according to claim 1, wherein the second transmission unit (32) is coupled to the spindle (42) via a spindle nut (44).

11. The longitudinal seat adjustment unit (2) according to claim 1, wherein the first transmission unit (31) and the second transmission unit (32) of at least one propulsion train (24) are arranged in a supporting part (45).

12. The longitudinal seat adjustment unit (2) according to claim 1, wherein the supporting part (45) has at least a first subsection (46) and a second subsection (47), the first transmission unit (31) being arranged in the first subsection (46) and the second transmission unit (32) being arranged in the second subsection (47).

13. The longitudinal seat adjustment unit (2) according to claim 4, wherein the second shaft (34) is in two pieces and in that the connection (48) can couple the two pieces.

14. The longitudinal seat adjustment unit according to claim 1, wherein the respective rail (40) comprises two spindles (42).

15. The longitudinal seat adjustment unit according to claim 1, wherein two spindles (42) are arranged on both sides of the respective second transmission unit (32) and in that the two spindles (42) operate in opposite directions.

16. A seat arrangement (1), in particular a seat arrangement (1) for a motor vehicle, comprising
   an interior floor (10) with a passenger compartment side (12) and an underside (11), and
   a longitudinal seat adjustment unit (2) according to claim 1,
   wherein the interior floor (10) has at least two parallel and spaced openings (15) in the longitudinal axis (X) which connect the passenger compartment side (12) and the underside (11), and
   the rails (40) and the second transmission units (32) are arranged on the underside (11), and
   wherein the first transmission units (31) and the drive device (22) are arranged on the passenger compartment side (12).

17. The seat arrangement (1) according to claim 16, wherein the supporting part (45) protrudes through the openings (15).

18. The seat arrangement (1) according to claim 1, wherein the first subsection (46) protrudes from the passenger compartment side (12) into the respective opening (15).

19. A motor vehicle with a longitudinal seat adjustment unit (2) according to claim 1.

20. A longitudinal seat adjustment unit (2), comprising
   a drive device (22),
   two rails (40), each with at least one spindle (42), which are arranged parallel to a longitudinal axis (X) and so as to be spaced from each other, and
   two drive trains (24) that can be driven by the drive device (22),
   wherein each of the drive trains (24) has a first transmission unit (31) and a second transmission unit (32), and the second transmission unit (32) is coupled to the drive device (22) via the first transmission unit (31), and
   wherein the second transmission unit (32) of the respective propulsion train (24) is coupled to one of the rails (40) in order to generate a propulsion in the longitudinal axis (X),
   wherein the first transmission unit (31) is connected to the drive device (22) via a first shaft (33) and the second transmission unit (32) is connected to the first transmission unit (31) via a second shaft (34),
   and wherein the second shaft (34) is in two pieces and in that the connection (48) can couple the two pieces.

* * * * *

UNITED STATES PATENT AND TRADEMARK OFFICE
CERTIFICATE OF CORRECTION

PATENT NO. : 12,240,359 B2
APPLICATION NO. : 17/685801
DATED : March 4, 2025
INVENTOR(S) : Gabriel Fuchs, Manuel Hengstler and Michael Knoepfle It is certified that error appears in the above-identified patent and that said Letters Patent is hereby corrected as shown below:

In the Claims

Claim 6, Column 8, Line 48, please delete the phrase "angle (α) is 90° = 15°" and replace with "angle (α) is 90° ± 15°".

Signed and Sealed this
Eighth Day of April, 2025

Coke Morgan Stewart
*Acting Director of the United States Patent and Trademark Office*